3,051,731
5,6,7,8-TETRAHYDRO-1-METHYL-2-NAPHTHOXY-ACETIC ACID ESTERS OF HYDROXY STEROIDS

Robert L. Hull, Madison Heights, and James R. Fisher, Royal Oak, Mich., assignors to Parke, Davis & Company, Detroit, Mich., a corporation of Michigan
No Drawing. Filed Apr. 11, 1960, Ser. No. 21,105
8 Claims. (Cl. 260—397.4)

The present invention relates to new long-acting cyclopentanopolyhydrophenanthrene derivatives and to methods for their production. More particularly, it relates to novel steroidal cyclopentanopolyhydrophenanthrene 5,6,7,8-tetrahydro-1-methyl-2-naphthoxyacetic acid esters.

It has been found as a feature of this invention that steroidal cyclopentanopolyhydrophenanthrene compounds hydroxylated in one or more of the 3-, 17-, or 21-positions and having a carbon skeleton of fewer than 22 carbon atoms react with 5,6,7,8-tetrahydro-1-methyl-2-naphthoxyacetic acid or a functional derivative thereof to form a 5,6,7,8-tetrahydro-1-methyl-2-naphthoxyacetoxy group at any of the said 3-, 17-, and 21-positions. Where the parent cyclopentanopolyhydrophenanthrene contains more than one hydroxy group, one or more of the said hydroxy groups may be converted to a 5,6,7,8-tetrahydro-1-methyl-2-naphthoxyacetoxy group. These esters exhibit the same type of pharmacological activity as that of the parent compound and in addition they exhibit a longer duration of action than either the parent compound or other known long-acting derivatives of the parent compound. They are soluble in a number of conventional physiologically compatible solvents such as e.g. a 40% benzylbenzoate-peanut oil mixture and may be administered by injection. They may also be administered as injectable aqueous suspensions. The novel esters of the invention find utility in situations where repository forms or long-acting derivatives of the parent compounds are indicated.

In accordance with the invention these long-acting esters are prepared by acylation of a steroidal cyclopentanopolyhydrophenanthrene compound hydroxylated in one or more of the 3-, 17-, or 21-positions and having a carbon skeleton of fewer than 22 carbon atoms with 5,6,7,8-tetrahydro-1-methyl-2-naphthoxyacetic acid or a functional derivative thereof. Examples of suitable functional derivatives are acid halides, activated esters, anhydrides and the like. The acylation is conveniently effected by employing an acid halide and preferably the chloride as acylating agent. In carrying out the acylation it is generally satisfactory to employ substantially one equivalent of the acyl halide for each hydroxy group to be acylated. The reaction is conveniently carried out in a mixture of an inert solvent such as N,N-dimethylformamide, benzene or tetrahydrofuran as a base, preferably a tertiary organic base, such as e.g. pyridine. The reaction mixture should preferably contain sufficient base to bind the hydrohalic acid formed in the course of the reaction. If desired, the acylation can be effected in pyridine alone as solvent medium. The time and temperature of the reaction are not critical; however, best results are obtained when the reaction is allowed to proceed at a temperature under 15° C.

Alternatively, the esters can be prepared from the free acid by the use of an acid catalyst such as e.g. p-toluenesulfonic acid in a refluxing inert solvent such as benzene, toluene and the like.

Preferred cyclopentanopolyhydrophenanthrene starting materials are hormonally active compounds having the carbon skeleton of androstane or estrane and 17-hydrocarbon substituted derivatives of such compounds. Suitable examples include testosterone, 19-nortestosterone, 17α-ethynyl-19-nortestosterone, 17α-methyl-Δ⁵-androstene-3β,17β-diol, 2-hydroxymethylene-17-α-methylandrostan-17β-ol-3-one, 17α-lower alkyl substituted-19-nortestosterone, dehydroepiandrosterone, estradiol, 17-α-methylestradiol, estrone and the like.

The 5,6,7,8-tetrahydro-1-methyl-2-naphthoxyacetic acid and functional derivatives thereof are novel per se and can be produced by the condensation, advantageously in a solvent medium, of 1-methyl-ar-2-tetralol or an alkali metal salt thereof and an α-halogenated acetic acid ester. Subsequent hydrolysis of the ester linkage in the 5,6,7,8-tetrahydro-1-methyl-2-naphthoxyacetic acid ester so obtained yields the corresponding acid. The 5,6,7,8-tetrahydro-1-methyl-2-naphthoxyacyl halides can be prepared by treating the parent acid with a suitable inorganic acid halide such as e.g. thionyl chloride, phosphorus tribromide and phosphorus oxychloride.

The invention is illustrated, but not limited, by the following examples:

Example 1

59.7 g. of 5,6,7,8-tetrahydro-1-methyl-2-naphthoxyacetyl chloride is added dropwise to a well-stirred solution of 57.7 g. of testosterone in 400 ml. of dry N,N-dimethylformamide and 23.7 g. of dry pyridine at 0–5° C. The resulting solution is allowed to stand overnight at room temperature and then added with stirring to 3 liters of ice water. The precipitate which forms is removed by filtration, washed with water, and dissolved in 1300 ml. ethyl acetate. The ethyl acetate solution is washed successively with 2 N sulfuric acid, water, 5% aqueous sodium bicarbonate and finally with water. The ethyl acetate solution is dried over anhydrous magnesium sulfate, filtered, and the solvent evaporated in vacuo. The testosterone-17-(5′,6′,7′,8′-tetrahydro-1′-methyl-2′-naphthoxyacetate) is recrystallized successively from isopropanol and methanol; M.P. 133–135° C. $[\alpha]_D^{26} = +78°$ (2% in absolute ethanol).

The 5,6,7,8-tetrahydro-1-methyl-2-naphthoxyacetyl chloride used in the above procedure may be prepared as follows: 122.2 g. of 1-methyl-ar-2-tetralol (R. L. Hull, J.A.C.S, 77, 6376 [1955]) is added to a solution of 17.3 g. of sodium in 565 ml. of absolute ethanol. The solution is cooled to ice bath temperature and 125.3 g. of ethyl bromoacetate added and the reaction mixture heated at reflux for one hour. 45.6 g. of sodium hydroxide dissolved in 565 ml. of water is added to the reaction mixture and the resulting solution heated on a steam bath for an additional 30 minutes. The warm solution is acidified with a solution of 40 ml. (1.44 equivalents) of concentrated sulfuric acid in 150 ml. water. After thorough cooling in an ice bath the 5,6,7,8-tetrahydro-1-methyl-2-naphthoxyacetic acid is collected by filtration, washed with water and dried; M.P. 156.5–157.5° C. The product can be recrystallized from a mixture of acetone and isooctane.

A mixture of 297 g. of 5,6,7,8-tetrahydro-1-methyl-2-naphthoxyacetic acid, 300 ml. of thionyl chloride and 300 ml. of dry benzene is heated at reflux for two hours.

The resulting solution is evaporated in vacuo on a steam bath, 100 ml. of isooctane added to the residue and the solution evaporated in vacuo to remove the last traces of thionyl chloride. The 5,6,7,8-tetrahydro-1-methyl-2-naphthoxyacetyl chloride is distilled under reduced pressure; B.P. 132–135° C./0.4 mm.

Example 2

1.5 g. of estradiol and 3.2 g. of 5,6,7,8-tetrahydro-1-methyl-2-naphthoxyacetyl chloride are dissolved in 25 ml. of acetone. 14 ml. of 1 N sodium hydroxide is added gradually with stirring during a period of approximately 5 minutes. The reaction mixture is then diluted with 486 ml. of 1 N sodium hydroxide and stirred for an additional 20 minutes. The estradiol 3-(5',6',7',8'-tetrahydro-1'-methyl-2'-naphthoxyacetate) is collected and washed repeatedly with water and then air dried; M.P.>65° C. (unevenly). The infrared absorption spectrum shows maxima at 3.05 and 5.65 microns.

The product can be recrystallized from ethanol, methanol, cyclohexane or acetone.

Example 3

3.0 g. of estradiol-3-benzyl ether is dissolved in a mixture of 20 ml. of pyridine and 10 ml. of N,N-dimethylformamide, the solution cooled to 5° C. and 3.0 g. of 5,6,7,8-tetrahydro-1-methyl-2-naphthoxyacetyl chloride added dropwise with stirring. The reaction mixture is then allowed to stand overnight and quenched in 100 g. of crushed ice. The estradiol 3-benzyl ether-17-(5',6',7',8'-tetrahydro-1'-methyl-2'-naphthoxyacetate) is collected by filtration, washed with water, dried and recrystallized successively from aqueous acetone and ethyl acetate; M.P. 156–157.5° C.

1.05 g. of estradiol 3-benzyl ether -17-(5',6',7',8'-tetrahydro-1'-methyl-2'-naphthoxyacetate) is dissolved in ethyl acetate, the solution placed in a bomb, and hydrogenated (50 p.s.i.) with 20% palladium on charcoal catalyst. The catalyst is separated from the reaction mixture by filtration and the ethyl acetate evaporated from the filtrate in vacuo. The residue is triturated with cyclohexane and the estradiol 17-(5',6',7',8' - tetrahydro - 1' - methyl - 2'-naphthoxyacetate) collected by filtration, and recrystallized successively from ethanol and acetone-ether; M.P. 186–187.5° C.

The estradiol 3-benzyl ether used in the above procedure can be prepared in the following manner: 16.6 g. of estradiol and 8.3 g. of benzyl chloride are dissolved in 270 ml. of absolute ethanol containing 0.0655 mole sodium ethoxide (from 1.5 g. sodium). The reaction mixture is refluxed for 4 hours and then allowed to stand overnight at room temperature. The sodium chloride formed in the course of the reaction is separated by filtration and the solution concentrated to about 70 ml. 30 ml. of warm water is added and the mixture cooled in an ice bath. The estradiol-3-benzyl ether which separates on cooling is collected, dried, and recrystallized from a benzene-cyclohexane mixture; M.P. 106–108° C.

Example 4

1.5 g. of estradiol is dissolved in a mixture of 20 ml. of dry pyridine and 10 ml. of dry N,N-dimethylformamide, and the solution is cooled to 5–10° C. 3.69 g. of 5,6,7,8-tetrahydro-1-methyl-2-naphthoxyacetyl chloride is added dropwise with stirring, the stirring is continued an additional 45 minutes and the reaction mixture then allowed to stand for 40 hours at room temperature. The reaction mixture is quenched with crushed ice and the gummy product which separates is triturated with cold water. After successive trituration with 100 ml. of warm acetone and 100 ml. of water, the estradiol-3,17-di(5',6',7',8'-tetrahydro-1'-methyl-2'-naphthoxyacetate) is collected, dried and recrystallized successively from a benzene-cyclohexane mixture and from ethyl acetate; M.P. 135–137° C.

Example 5

4.8 g. of 5,6,7,8-tetrahydro-1-methyl-2-naphthoxyacetyl chloride is added dropwise to a solution of 4.1 g. of 19-nortestosterone in a mixture of 25 ml. dry N,N-dimethylformamide and 2.0 g. of dry pyridine at 0 to 5° C. The reaction mixture is allowed to stand overnight at room temperature and added with stirring to 200 ml. of ice water. The precipitate which forms is collected by filtration, washed with water, and dissolved in 100 ml. of ether. The ethereal solution is washed successively with 2 N sulfuric acid, water, 5% sodium bicarbonate and finally with water. The ethereal solution is then dried over anhydrous sodium sulfate, filtered, and the filtrate concentrated to yield a gummy solid residue. The residue is dissolved in 25 ml. of benzene and chromatographed on an alumina column, eluting the 19-nortestosterone-17-(5',6',7',8' - tetrahydro - 1' - methyl - 2' - naphthoxyacetate) with benzene. The benzene eluate is concentrated in vacuo and the 19-nortestosterone-17-(5',6',7',8'-tetrahydro-1'-methyl-2'-naphthoxyacetate) crystallized from methanol; M.P. 141–142° C.

Example 6

6.0 g. of 5,6,7,8-tetrahydro-1-methyl-2-naphthoxyacetyl chloride is added dropwise to a solution of 6.0 g. of 17α-ethynyl-19-nortestosterone in a mixture of 50 ml. of dry N,N-dimethylformamide and 2.4 g. of dry pyridine cooled to 0° C. The reaction mixture is allowed to stand at room temperature overnight and then poured with stirring into 300 ml. of ice water. The precipitate which forms is dissolved in ethyl acetate, the ethyl acetate solution washed with water and dried over anhydrous magnesium sulfate. The ethyl acetate is evaporated in vacuo, the residue dissolved in 25 ml. of isopropyl ether and chromatographed on a column of alumina. The desired 17α - ethynyl - 19 - nortestosterone - 17 - (5',6',7',8' -tetrahydro-1'-methyl-2'-naphthoxyacetate) is eluted with isopropyl ether and recovered from the eluate by evaporation of the isopropyl ether solvent; M.P. 175–177° C. after recrystallization from methanol.

Example 7

3.8 g. of 5,6,7,8-tetrahydro-1-methyl-2-naphthoxyacetyl chloride is added dropwise at 0–5° C. to a solution of 5.4 g. of prednisolone dissolved in a mixture of 25 ml. of dry N,N-dimethylformamide and 2.0 g. of dry pyridine. The reaction mixture is allowed to stand overnight at room temperature and then added to 200 ml. of ice water. The prednisolone - 21 - (5',6',7',8' - tetrahydro-1'-methyl-2'-naphthoxyacetate) which precipitates is collected by filtration, washed with water, dried, and recrystallized from a mixture of ethylene dichloride and isopropyl ether; M.P. 193–195° C., $[\alpha]_D^{27} = +99°$ (1% in dioxane).

What is claimed is:
1. Testosterone - 17 - (5',6',7',8' - tetrahydro - 1' - methyl-2'-naphthoxyacetate).
2. 19 - nortestosterone - 17 - (5',6',7',8' - tetrahydro - 1'-methyl-2'-naphthoxyacetate).
3. Estradiol - 3 - (5',6',7',8' - tetrahydro - 1' - methyl - 2'-naphthoxyacetate).
4. Estradiol - 17 - (5',6',7',8' - tetrahydro - 1' - methyl - 2'-naphthoxyacetate).
5. Estradiol 3,17 - di(5',6',7',8' - tetrahydro - 1' -methyl-2'-naphthoxyacetate).
6. 17α - Ethynyl - 19 - nortestosterone - 17 - (5',6',7',8'-tetrahydro-1'-methyl-2'-naphthoxyacetate).
7. Prednisolone - 21 - (5',6',7',8' - tetrahydro - 1' - methyl-2'-naphthoxyacetate).
8. 5,6,7,8 - tetrahydro - 1 - methyl - 2 - naphthoxy - acetic acid esters of hormonally active hydroxy steroids selected from the class consisting of compounds of the formula

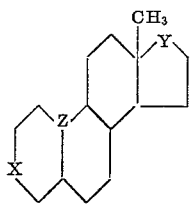

and compounds of the same formula with fewer than 4 nuclear double bonds, said nuclear double bonds being restricted in location to positions 1, 3, 4 and 5; where X is a member of the class consisting of carbonyl, hydroxymethylene and hydroxymethenyl, and Y is a member of the class consisting of carbonyl, hydroxymethylene, C(lower alkyl)—OH, and C(ethynyl)—OH, X and Y being so selected that both are not carbonyl; and Z is a member of the class consisting of C, CH, and C—$CH_3$.

References Cited in the file of this patent

UNITED STATES PATENTS

| | | |
|---|---|---|
| 2,183,589 | Reichstein et al. | Dec. 19, 1939 |
| 2,904,562 | Diczfalusy et al. | Sept. 15, 1959 |

OTHER REFERENCES

Gould et al.: J.A.C.S. 79, 4472–75 (1957).